US009636606B2

(12) United States Patent
Kaasa et al.

(10) Patent No.: US 9,636,606 B2
(45) Date of Patent: May 2, 2017

(54) MULTI-PHASE DISTRIBUTION SYSTEM, SUB SEA HEAT EXCHANGER AND A METHOD OF TEMPERATURE CONTROL FOR HYDROCARBONS (75) Inventors: Baard Kaasa, Ranheim (NO); Bernt Henning Rusten, Jakobsli (NO); Knut Arild Maråk, Trondheim (NO); Arne Olav Fredheim, Trondheim (NO)

(73) Assignee: Statoil Petroleum AS, Stavanger (NO)

( * ) Notice: Subject to any disclaimer, the term of this patent is extended or adjusted under 35 U.S.C. 154(b) by 439 days.

(21) Appl. No.: 14/130,284

(22) PCT Filed: Jul. 1, 2011

(86) PCT No.: PCT/EP2011/061148
§ 371 (c)(1),
(2), (4) Date: Jun. 5, 2014

(87) PCT Pub. No.: WO2013/004276
PCT Pub. Date: Jan. 10, 2013

(65) Prior Publication Data
US 2014/0318737 A1    Oct. 30, 2014

(51) Int. Cl.
*B01D 19/00*    (2006.01)
*F28D 1/02*    (2006.01)
(Continued)

(52) U.S. Cl.
CPC ......... *B01D 19/0021* (2013.01); *F28D 1/022* (2013.01); *F28D 1/0472* (2013.01);
(Continued)

(58) Field of Classification Search
CPC ........ F28D 1/022; F28D 1/0472; F28F 1/006; F28F 27/00; F28F 9/0265; F28F 9/0282; B01D 19/0021
(Continued)

(56) References Cited

U.S. PATENT DOCUMENTS 3,158,010 A * 11/1964 Kuerston ............... F25J 3/0209
165/145
3,450,197 A    6/1969 Fieni
(Continued)

FOREIGN PATENT DOCUMENTS

DE    102006055122 A1    6/2007
EP    0816146 A2    1/1998
(Continued)

OTHER PUBLICATIONS

International Search Report received for PCT Patent Application No. PCT/EP2011/061148, mailed on Jan. 31, 2012, 4 pages.
(Continued)

*Primary Examiner* — Allana Lewin Bidder
*Assistant Examiner* — Raheena Rehman
(74) *Attorney, Agent, or Firm* — Morrison & Foerster LLP (57) ABSTRACT

The invention relates to a multi-phase distribution system, a sub sea heat exchanger provided with such a multi-phase distribution system, the use of such a multi-phase distribution system and a method of temperature control for hydrocarbons. The invention provides an improved control over multi-phase mixtures comprising hydrocarbons and improvements in the controlling of heat exchanging processes.

13 Claims, 5 Drawing Sheets

(51) Int. Cl.
*F28D 1/047* (2006.01)
*F28F 1/00* (2006.01)
*F28F 9/02* (2006.01)
*F28F 27/00* (2006.01)

(52) U.S. Cl.
CPC ............ *F28F 1/006* (2013.01); *F28F 9/0265* (2013.01); *F28F 9/0282* (2013.01); *F28F 27/00* (2013.01)

(58) Field of Classification Search
USPC .................................... 165/45, 174; 62/525
See application file for complete search history.

(56) References Cited

U.S. PATENT DOCUMENTS

| | | | | |
|---|---|---|---|---|
| 3,990,504 | A | | 11/1976 | Kolthoff, Jr. |
| 4,922,732 | A | * | 5/1990 | Eriksson ............... F25B 39/028 165/174 |
| 5,910,167 | A | * | 6/1999 | Reinke .................. F25B 39/028 165/174 |
| 6,688,137 | B1 | * | 2/2004 | Gupte .................. F25B 39/022 62/515 |
| 7,832,231 | B2 | * | 11/2010 | Knight .................. F25B 39/028 62/509 |
| 8,281,615 | B2 | * | 10/2012 | Tucker .................. F25B 39/028 62/515 |
| 2006/0101849 | A1 | * | 5/2006 | Taras ...................... F25B 39/00 62/515 |
| 2006/0266502 | A1 | * | 11/2006 | Khazani .............. F28D 1/05341 165/146 |
| 2007/0119580 | A1 | * | 5/2007 | Wawzyniak ........ F28D 1/05383 165/174 |
| 2008/0060199 | A1 | * | 3/2008 | Fuller .................... B21D 28/28 29/890.052 |
| 2008/0092587 | A1 | * | 4/2008 | Gorbounov ........... F25B 39/028 62/498 |
| 2008/0093062 | A1 | * | 4/2008 | Gorbounov ........... F25B 39/028 165/173 |
| 2008/0141707 | A1 | * | 6/2008 | Knight .................. F25B 39/028 62/498 |
| 2008/0251245 | A1 | * | 10/2008 | Gorbounov ........... F25B 39/028 165/178 |
| 2011/0132587 | A1 | * | 6/2011 | Tucker .................. F25B 39/028 165/175 |

FOREIGN PATENT DOCUMENTS

| | | |
|---|---|---|
| GB | 248713 | 11/1926 |
| GB | 740848 | 11/1955 |
| WO | 03/078014 A1 | 9/2003 |
| WO | 2008/147219 A2 | 12/2008 |
| WO | 2010/002272 A1 | 1/2010 |
| WO | 2011/008101 A2 | 1/2011 |

OTHER PUBLICATIONS

Written Opinion received for PCT Patent Application No. PCT/EP2011/061148, issued on Jan. 1, 2014, 5 pages.
International Preliminary Report on Patentability received for PCT Patent Application No. PCT/EP2011/061148, mailed on Jan. 16, 2014, 7 pages.

* cited by examiner

MULTI-PHASE DISTRIBUTION SYSTEM, SUB SEA HEAT EXCHANGER AND A METHOD OF TEMPERATURE CONTROL FOR HYDROCARBONS

CROSS REFERENCE TO RELATED APPLICATIONS

This application is a U.S. National Phase Patent Application of PCT/EP2011/061148, filed on Jul. 1, 2011, which is hereby incorporated by reference in the present disclosure in its entirety.

FIELD OF THE INVENTION

The invention relates to a multi-phase distribution system. The invention further relates to a sub sea heat exchanger provided with such a multi-phase distribution system, the use of such a multi-phase distribution system and a method of temperature control for hydrocarbons.

BACKGROUND

The temperature of a produced hydrocarbon containing stream at sub sea level is generally hot and may normally vary in temperatures in the range of 30-150° C. at the prevailing pressures. Depending on temperature, pressure and the components of the produced hydrocarbon, the produced hydrocarbon is usually obtained as a mixture of gases and liquid. The mixture may comprise multiple liquid phases, typically at least a hydrocarbon phase and at least an aqueous phase. In order to process or transport such a hot hydrocarbon liquid stream, it may be necessary to regulate the temperature of the stream, typically by cooling the stream to a specific temperature range of 0-60° C.

A known type of sub sea coolers consists of bundles of steel tubes in which the warm process stream flows. Seawater at approximately 4° C. freely flows across the outside of the tubes, directly cooling the process stream by heat dissipating through the steel tube walls to the surrounding seawater. The amount of cooling strongly depends on the sea current, as the heat transfer is increased multiple times if there is a strong sea current. In this way, the outlet temperature of the process stream is given by uncontrollable variables.

Hydrocarbon liquids may develop wax and hydrate depositions when cooled down below certain temperatures. A build up of wax and/or hydrate depositions inside tubes or process equipment will reduce the capacity of said parts and in worst case lead to blocking which stops productions and is both time consuming and costly to remove. Hence, uncontrolled cooling of hydrocarbon liquids at sub sea level is undesirable, as the outlet temperature of such coolers may result in undesirable process conditions, such as temperatures below the wax or hydrate formation temperature in the liquid. WO 2008/147219, (FMC Kongsberg Sub sea), describes a sub sea cooling unit having an inlet for a hot liquid and an outlet for cooled liquid, the cooling unit comprising a number of coiled tubes exposed to seawater, and means for generating a flow of seawater past the coils, where the means for generating the flow of seawater comprises a propeller and a pivotal actuator and wherein the cooler is enclosed in a duct.

WO 2010/002272, (Aker Sub sea AS), concerns a sub sea convection heat exchanger for cooling or heating a hydrocarbon-containing liquid in sub sea environment. The heat exchanger comprises a convection section with a liquid carrying pipe adapted for heat transfer between the carried hydrocarbon liquid on one side of the pipe wall and the surrounding water on the opposite side of the pipe wall. The convection section is enclosed by an enclosure with a seawater inlet and a seawater outlet and the heat exchanger is provided with means for controlled through-flow of the surrounding seawater from the seawater inlet to the seawater outlet.

SUMMARY AND OBJECT OF THE INVENTION

It is an object of the invention to provide an improved control of multi-phase mixtures, in particular for gas/liquid mixtures. More in particular, it is an object of the invention to provide an improved multi-phase distribution system for use in a sub sea heat exchanger. It is another object of the invention to provide an improved control over multi-phase mixtures comprising hydrocarbons. More in particular, it is the object to provide means for controlling heat exchanging processes in a better way than possible with existing heat exchangers.

The invention provides a multi-phase distribution system for a gas/liquid mixture, comprising at least one distribution chamber provided with a distribution surface for spreading liquid, at least one inlet, arranged for supplying a hydrocarbon-containing gas/liquid mixture to the distribution surface, a collecting space at least partly defined by the distribution surface, for collecting gas separated from the gas/liquid mixture, and multiple outlet elements arranged on the distribution surface for transporting gas from the collecting space and liquid from the distribution surface away from the multi-phase distribution system.

The multi-phase distribution system allows for a more controlled supplying of the multi-phase mixture to subsequent processing units, for instance a heat exchanger. The system allows control of the flow of gas and one or more liquid phases, providing a more stable ratio of liquid phases and gas in a predetermined range.

The separation of the liquid and gas phase and subsequent supplying of for instance gaseous and liquid hydrocarbon, to the outlets allows for a more controlled subsequent process, for instance a heat exchanging process in heat exchanger channels that may be connected to the outlets in a subsequent heat exchanging unit. Thus the capacity of the heat exchanger is used optimally, in contrast to a situation wherein the gas/liquid mixture is lead directly into the heat exchanging channels. This makes it easier to control the temperature of the outlet process stream, and better the control the possible formation of hydrates or wax that may clog the heat exchanger channels, typically in tubes with a relatively low flow which may occur when the stream is unevenly distributed over the heat exchanger channels.

The distribution chamber may have any suitable form, and is constructed to withstand deep sea pressures. Preferred shapes for distribution chambers constructed for deep sea use are tubular and dome-shaped chambers, preferably made of welded steel. The distribution surface may be a wall or floor of the distribution chamber.

The inlet may for instance be a pipe of tube let in from a source of hydrocarbon liquid. The distribution chamber may have multiple inlets that may be connected to the same or different hydrocarbon sources. Optionally, the distribution chamber may also be provided with one or more auxiliary inlets that may for instance be used for cleaning liquids or supplying additional chemicals to the hydrocarbon that may be admixed with the hydrocarbons, for instance chemicals for preventing or reversing the formation of hydrates or wax clogs in the heat exchanger channels. The multi-phase distribution system also improves the distribution of such additives over the heat exchanger channels.

The outlet elements are arranged to connect to multiple heat exchange channels that can be connected to the outlet elements. In a preferred embodiment, the outlet elements may also be constructed from the distal ends of heat exchange channels. It is preferred if the number of outlet elements corresponds to the number of heat exchange channels, but it is also possible to have multiple outlets connected to a single heat exchanger channel or multiple heat exchanger channels connected to a single outlet element. The outlet elements may be arranged in various patterns on the distribution surface. The outlet elements may all be similar but may also differ, depending on the desired distribution of the liquid in the heat exchanger channels.

Preferably, the outlet elements protrude from the distribution surface towards the collecting space. Having the outlet elements protrude from the distribution surface allows both the liquid and gas to enter the outlet elements simultaneously, depending on the liquid level It is preferred if the outlet element has an essentially tubular shape. The open end of a tubular shape is particularly suitable as an entrance for gas and/or liquid, and may be easily adapted using standard tools. Preferably the outlet elements are designed to transport away both gas and liquid simultaneously.

Preferably, the outlet element comprises at least one flow aperture, wherein the flow aperture is arranged to provide a gas flow area for transporting gas from the collecting space, and a liquid flow area for transporting liquid from the distribution surface. The flow area available for liquid phase and gas phase will vary according to the incoming flow rate and liquid fraction. The flow area for gas and liquid out of the distribution chamber is self-regulating. Within a predetermined liquid level range, the flow area profile compensates an increase in the flow level by allowing the liquid access to a greater flow area, helping to adjust the flow level to within a predetermined range of liquid levels while controlling the ratio of gas and liquid entering the outlet element. The liquid and gas apertures may have different shapes suitable to accomplish this, and may also define sub areas of a single aperture. The apertures may have similar shapes, but also different shapes may be combined. The outlet elements may be provided with a single or multiple flow apertures. The flow aperture may for instance be an opening or multiple openings created in the wall and/or the distal end of a tube. Ideally, the flow aperture is arranged to allow liquid phases to enter the outlet element to be guided along the wall of an outlet channel, whereas the gas phase is lead to a central portion of the outlet channel. This allows for a good control of the gas flow rate and liquid flow through each outlet element.

It is advantageous if at least one flow aperture is arranged to provide a flow area profile, wherein the liquid flow area increases as a function of the increasing liquid level on the distribution surface. The flow area profile is imposed by the shape and form of the flow aperture or apertures, and their orientation and vertical position with respect to the distribution surface. Thus, the flow of liquid through the outlet is self-controlled by the horizontal level of liquid on the distribution surface. As this can be accomplished without moving parts, the chance of having defects is relatively low. Typically, once all of the flow aperture is covered in liquid, the available liquid flow area can not increase any further, whereas if the liquid level drops below the levels covered by the flow aperture, there would be no liquid flow area available and all of the flow aperture would be available as a gas flow area. Preferably, the total flow area available for gas and liquid combined is constant, implying that the liquid flow area increases at the expense of gas flow area and vice versa. Different outlet elements may have different flow area profiles.

Preferably, for at least part of the flow area profile, the liquid flow area increases as a non-linear function of the increasing liquid level on the distribution surface. A non-linear function allows for a more precise dynamic control of the flow rate in response to changing liquid levels, without the need for moving parts. The non-linear function may for instance comprise an exponential function which may comprise convex and/or concave curves, as well as level and inclined areas, and step-wise increases.

Most preferably, for at least part of the flow area profile, the liquid flow area increases at a higher rate than the increase in liquid level on the distribution surface. Thus an elevated liquid level leads to an increased liquid flow rate, which helps to keep the liquid level on the distribution surface between predetermined levels.

It is advantageous if the liquid aperture comprises at least one V-shape. The V-shaped aperture, preferably with the narrower flow area closer to the distribution surface, allows for easy control of liquid levels. The V-shape may have straight legs, but may also have curved legs for an even more refined control of the liquid levels. The outlet element may be provided with a single V-shaped aperture or multiple V-shaped apertures. For tubular outlet element, it may be particularly attractive to have two opposite V-shaped elements, which are relatively easy to cut out of a tube end.

In another preferred embodiment, the liquid aperture comprises at least at least one essentially circular or ellipsoid hole. The flow area is easily defined by the diameter of the hole. Preferably, multiple holes of identical or different diameter are used to define a pattern of liquid holes.

In yet another preferred embodiments, the liquid aperture comprises at least one slit. Slits are relatively easy to manufacture. The slits may be directed perpendicular to the distribution surface, under and angle with the distribution surface or essentially parallel to the distribution surface. Straight slits are preferred, as these are easier to machine into for instance a distal end of a tube.

It is advantageous if the outlet element comprises multiple liquid apertures arranged in a pattern. The patterns make it easy to provide a desired flow area vs. liquid level profile.

Preferably, the multi-phase distribution system according to the invention has a distribution chamber provided with at least one baffle element arranged to prevent direct spilling of the gas/liquid mixture from the inlet to the outlets. This allows for an improved control over the flow lead to the heat exchanger channels through the outlets.

The invention also provides a sub sea heat exchanger comprising a multi-phase distribution system according to the invention, wherein the outlet elements of the multi-phase distribution system are connected to heat exchange elements. This provides the heat exchanger with the advantages described herein.

The multi-phase distribution system may be integrated with the sub sea heat exchanger or another apparatus for processing multiphase mixtures, or may be provided as a modular unit. The outlet elements of the multi-phase distribution system may actually be the distal ends of heat exchanger channels. In a convection heat exchanger, is preferred if the multi-phase distribution system is positioned above the heat exchanger channels.

The invention further provides a method of temperature control for hydrocarbons, comprising the steps of providing a liquid fraction of hydrocarbons, providing a gaseous fraction of hydrocarbons, providing a tubular heat exchange channel, and transferring the liquid fraction and the gaseous fraction into the heat exchange channel, wherein the liquid fraction is mostly transported through the channel along a wall of the channel, and the gaseous fraction is transported mostly through a central portion away from the wall of the channel. Preferably, this method is performed using a multi-phase distribution system according to the invention

BRIEF DESCRIPTION OF THE DRAWINGS

The invention will now be further elucidated by the following non-restrictive embodiments.

DETAILED DESCRIPTION OF THE INVENTION

Figure 1:
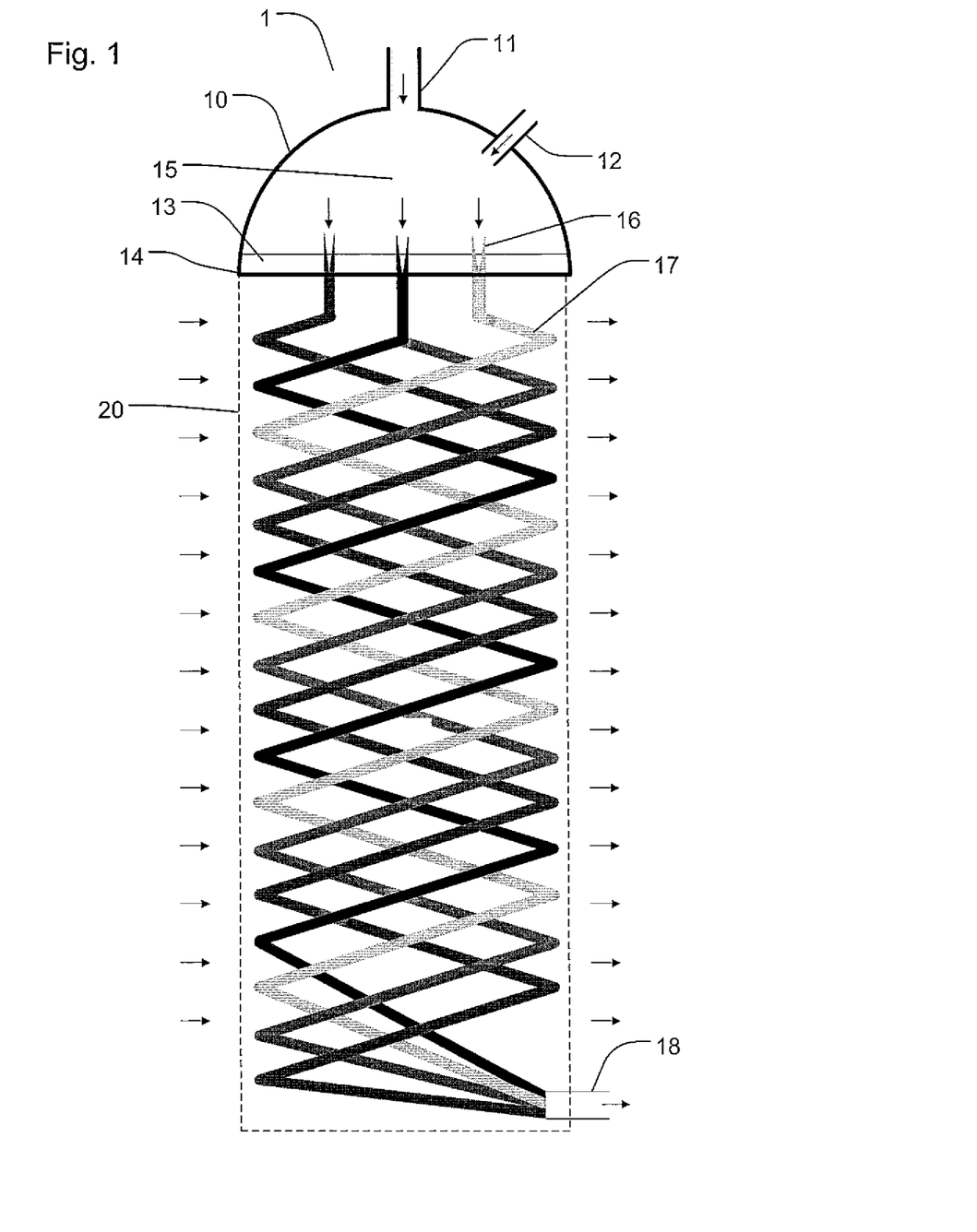
FIG. 1 shows a sub-sea heat exchanger according to the invention.

FIG. 1 shows a cross sectional view of a first embodiment of a heat exchanger 1 according to the present invention. The heat exchanger 1 comprises a multi-phase distribution header 10 and a convection heat exchanger section 20.

The two phase distribution header 10 comprises an enclosure shell provided with an inlet 11, through which a hot mixture of liquid and gaseous hydrocarbons is supplied. Optionally, the enclosure may be provided with one or more additional inlets 12, through which additional streams of hydrocarbons or additives such as antihydrate- or antiwax-forming agents may be introduced into the produced hydrocarbon mixture.

The liquid fraction 13 of the hydrocarbons is collected and spread out over the surface of the distribution floor 14, whereas the gaseous fraction is contained in the collection space 15 above the distribution floor 14. Multiple outlet tubes 16 protrude from the floor 14, which are designed to transport gas and liquid 13 fractions together to the heat exchanger pipes 17. In the heat exchanger tubes, both the gas and liquid fractions are cooled down, usually causing at least part of the gas to condense into a liquid. The cooling may be done by directly leading sea water past the exterior of the heat exchanger tubes 17, or by indirect cooling using a heat transfer system with an intermediate cooling medium. The layout of the tubes 17 inside the convection section 20 may be assembled in a helical manner as shown in FIG. 1, such as in a helical spiral wound arrangement, wherein a large area of heat transfer may be enabled within a small volume. The cooled hydrocarbon mixture is then transported away from the heat exchanger tubes 17 through a common outlet channel 18.

Different types of multi-phase distribution headers may be used in the heat exchanger. Examples of suitable distribution headers are found in FIGS. 2a-2c. Details of various types of outlet tubes 16 are found in the examples given in FIGS. 3a-3d.

Figure 2A:
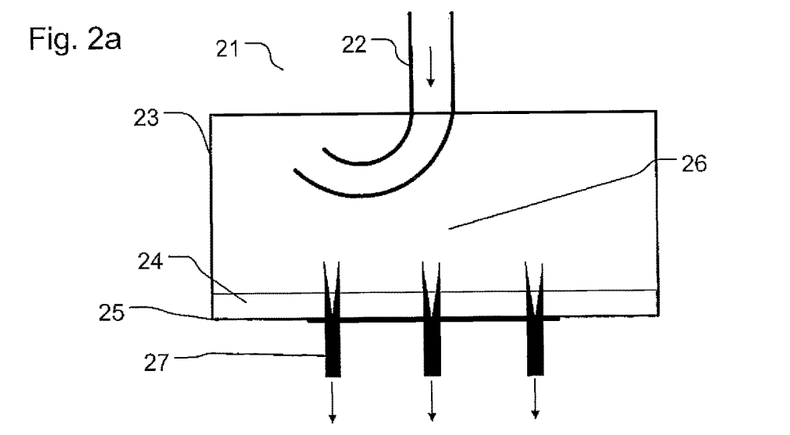
FIGS. 2a-2c show examples of multi-phase distribution systems according to the invention.
Figure 2B:
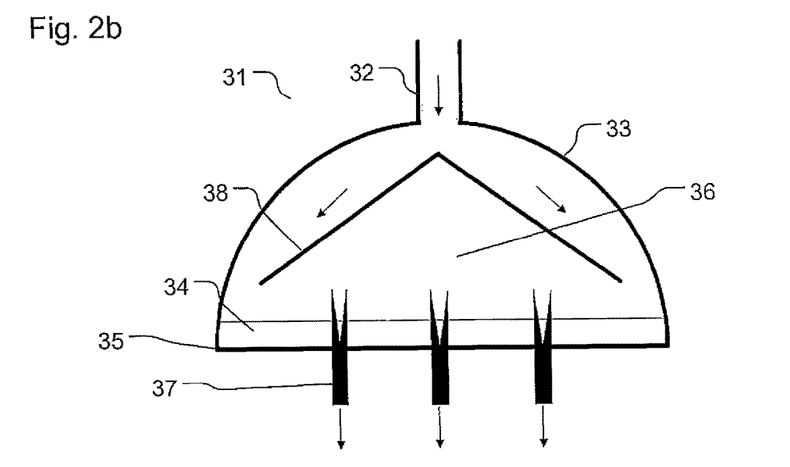
Figure 2C:
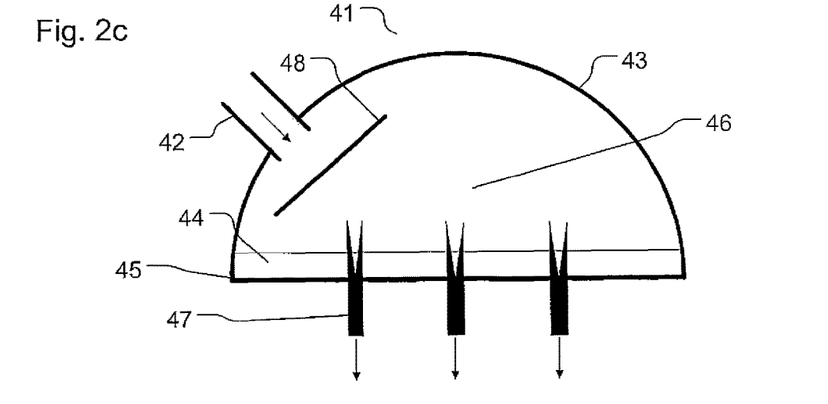

FIGS. 2a-2c show examples of multi-phase distribution systems according to the invention.

FIG. 2a shows an embodiment of a two phase distribution header 21, differing from the header in FIG. 1, wherein the inlet 22 is bent an the exit opening of the inlet 22 is aimed towards the wall of the shell enclosure 23. The shell enclosure 23 acts as a baffle plate, which allows for an improved separation of gas and liquid fraction. The liquid fraction 24 is collected on the bottom surface 25, whereas the gaseous phase assembles in the collector space 26 above the bottom surface 25. The bottom surface 25 is provided with multiple outlet elements 27, which transport the liquid and gas to the heat exchanger pipes (as shown in FIG. 1) in a controlled way. Details of examples of outlet elements 27 that may be used will be shown in FIGS. 3a-d. For clarity, only three outlet elements 27 are shown, but many more outlet elements may be present. Typically, a single outlet element 27 is connected to a single heat exchanger pipe. The outlet elements 27 may be arranged in various patterns on the bottom surface 25.

FIG. 2b shows another alternative embodiment of a two phase distribution header 31, wherein the inlet 32 is aimed towards a tilted baffle plate 38 arranged in the shell enclosure 33. The tilted baffle plate 38 is positioned as a shield and diverts the stream of the liquid/gas mixture to the sides of the enclosure 33, and prevents direct spilling of the liquid/gas mixture from the entry inlet 32 into the outlet elements 37. The liquid fraction 34 is collected on the bottom surface 35, whereas the gaseous phase assembles in the collector space 36 above the bottom surface 35. The bottom surface 35 is provided with multiple outlet elements 37 similar to FIG. 2a.

FIG. 2c shows another alternative embodiment of a two phase distribution header 41, wherein the inlet 42, located at a side of the shell enclosure 43, and is aimed towards a baffle plate 48 arranged therein. The baffle plate 48 is positioned as a shield and prevents direct entry of the liquid/gas mixture from the entry inlet 42 into the outlet elements 47. The liquid fraction 44 is collected on the bottom surface 45, whereas the gaseous phase assembles in the collector space 46 above the bottom surface 45. The bottom surface 45 is provided with multiple outlet elements 47 similar to FIG. 2a and FIG. 2b.

FIGS. 3a-3d show examples of multi-phase outlet elements according to the invention.

Figure 3A:
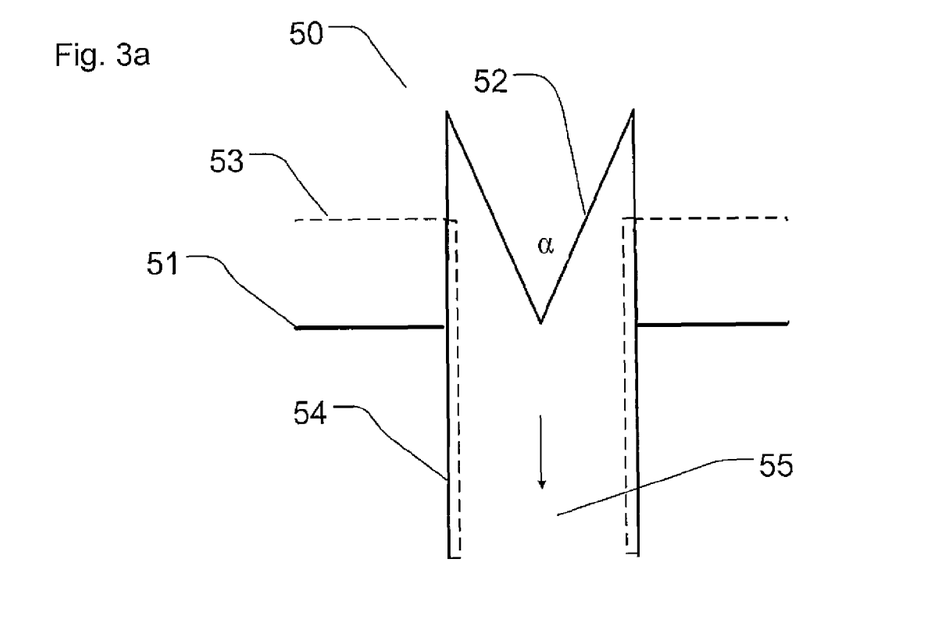
FIGS. 3a-3d show examples of multi-phase outlet elements according to the invention.

FIG. 3a shows a tubular outlet element 50 arranged in a bottom surface 51. The outlet element 50 comprises an essentially V-shaped split aperture 52, which allows the liquid fraction 53 to enter the tube 54 as a film along the tube wall 54, whereas the gaseous fraction enters the tube 54 from the top and is transported through the centre 55 of the tube. The V-shape allows self-regulation of the level of the liquid 53, ensuring that the accessible entry aperture into the tube becomes larger when the liquid level 53 rises, thus allowing for a greater liquid flow into the tube 54 that leads to the heat exchanger area. The V-shape may deviate from the form shown here. The tube 54 may have several V-shaped apertures 53, the actual V-shape may have different angles $\alpha$, and the sides of the V may be straight or curved.

Figure 3B:
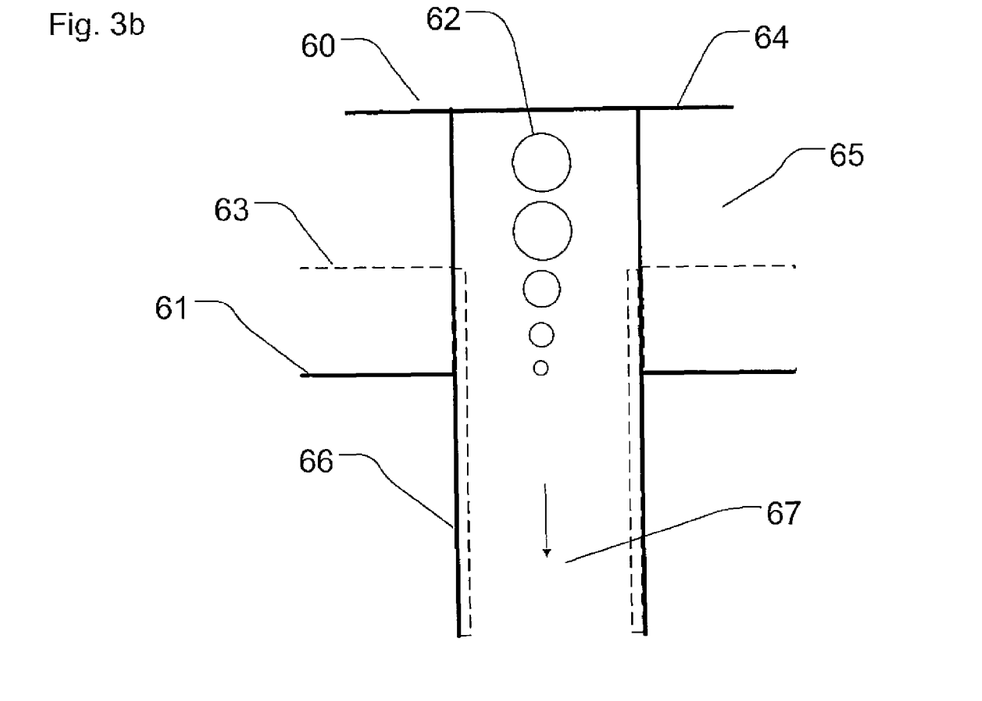

FIG. 3b shows an alternative embodiment of a tubular outlet element 60 arranged in a bottom surface 61. The outlet element 60 comprises several circular, ellipsoid or otherwise shaped apertures 62, wherein the apertures 62 have an increasing aperture area going from close to the bottom surface 61 to positions away from the surface 61. In this example, the apertures were arranged in a linear fashion, but the apertures may be arranged according to various patterns. The total aperture area available for flow-through of the liquid 63 increases in a non-linear fashion going from the bottom side towards the open tube end 64. With increasing liquid levels, the area of the tube end available for flow-through of gas 65 present above the liquid 63 remains essentially the same. The increasing total aperture area allows self-regulation of the level of the liquid 63, ensuring that the available entry area into the tube becomes larger when the liquid level 63 rises, thus allowing for a greater flow into the tube 66 that leads to the heat exchanger area. The apertures allow the liquid fraction 63 to enter the tube 66 as a film along the tube wall 66, whereas the gaseous fraction enters the tube from the top 64 and is transported mostly through the centre 67 of the tube.

Figure 3C:
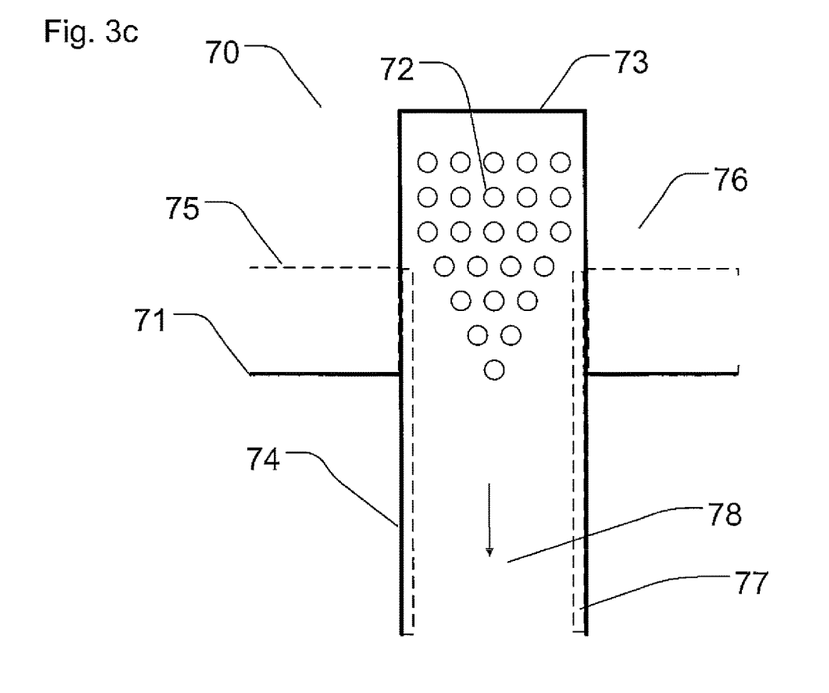

FIG. 3c shows an alternative embodiment of a tubular outlet element 70 arranged in a bottom surface 71. The outlet element 70 comprises several circular, ellipsoid or otherwise shaped apertures 72, with essentially the same size. Having apertures of the same size makes it possible to easily manufacture the tube end using the same tool, such as a drill. The density of apertures increases going from the bottom side 71 towards the open top 73 of the tube 74, which corresponds with an essentially linear increase of the total available aperture area for the liquid when the level of the liquid fraction 75 rises, at least for part of the range of liquid levels. However, it is also relatively easy to make a non-linear aperture area vs. liquid level profile using a pattern of holes. With increasing liquid levels, the area of the open tube end 73 available for flow-through of gas 76 present above the liquid 75 remains essentially the same. The increasing total aperture area allows self-regulation of the level of the liquid 75. The apertures 72 allow the liquid fraction 75 to enter the tube 74 as a film 77 along the tube wall 74, whereas the gaseous fraction enters the tube from the top 73 and is transported mostly through the centre section 78 of the tube.

Figure 3D:
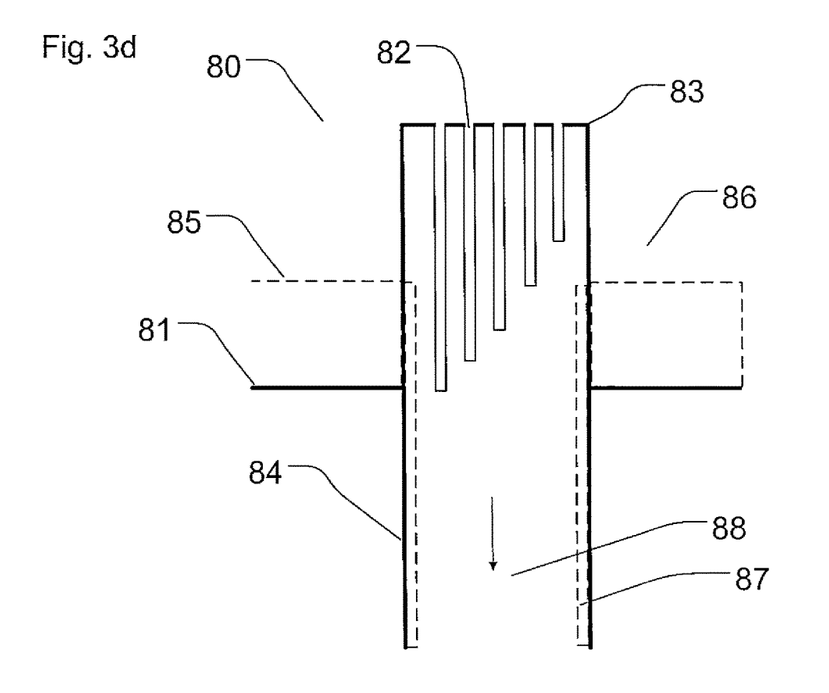

FIG. 3d shows yet another alternative embodiment of a tubular outlet element 80 arranged in a bottom surface 81. The outlet element 80 comprises several straight slits 82 cut out from the top 83 of the tube wall 84 towards the bottom surface 81. The slits are essentially perpendicular to the surface 81 in this example, but could also be cut under an angle. By varying the depth and density of the slits 82 of a certain depth, a profile of the aperture area vs. the level of the liquid 85 can be easily accomplished as desired, using relatively simple tools. Also, slits 82 are relatively simple to clean using a stream of cleaning liquid or tools such as a brush. With increasing liquid levels, the area of the open tube end 83 available for flow-through of gas 86 present above the liquid 85 remains essentially the same. The increasing total aperture area allows self-regulation of the level of the liquid 85. The slits 82 allow the liquid fraction 85 to enter the tube 84 as a film 87 along the tube wall 84, whereas the gaseous fraction enters the tube from the top 83 and is transported mostly through the centre section 88 of the tube 84.

Figure 4:
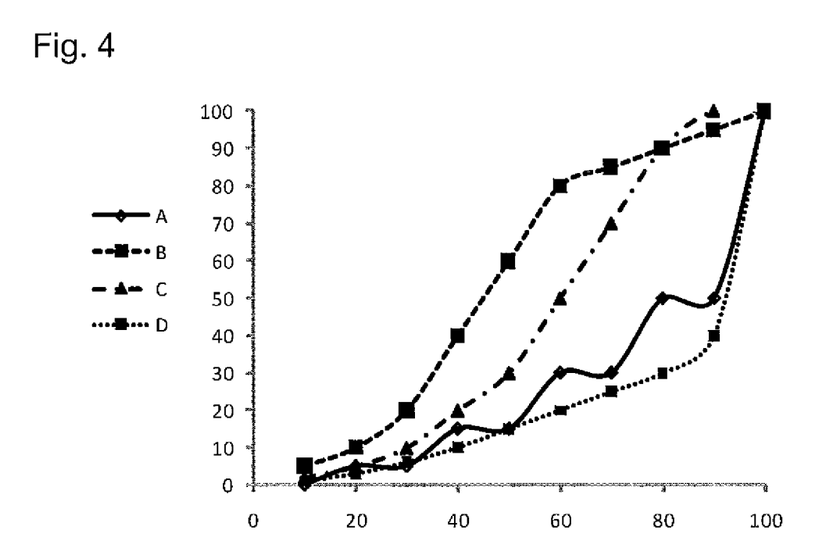
FIG. 4 shows examples of flow area profiles of multi-phase outlet elements according to the invention.

FIG. 4 shows examples of flow area profiles of multi-phase outlet elements according to the invention. The profiles are shown as the flow area taken up by the liquid phases as a percentage of the total available flow area (AFA) for the gas and liquid phases combined, as a function of the level of the liquid phases calculated from the bottom of the distribution chamber from which the multi-phase outlet element protrudes, assuming a horizontal distribution surface. The percentage level is arbitrarily chosen for each profile. The flow profiles shown here, as well as variations of these flow profiles, may be achieved by various types of outlet elements, for instance by modification of the outlet elements shown in FIGS. 3a-3d. The flow profiles are designed to control the flow rate to the input of liquid by dampening fluctuations in liquid levels, thus allowing to control the liquid/gas ratio of the output, that may be fed to for instance a heat exchanger. Heat exchangers provided with a controlled input of liquid and as will work more efficiently.

Flow area profile A shows a stepwise increasing flow area profile, which may for instance be achieved by a vertical open tube provided with multiple apertures of increasing diameter arranged vertically. This results in a stepwise exponentially increasing profile, providing a larger flow area when the liquid level with respect to the distribution area rises.

Flow area profile B shows an exponential increase of the AFA at relatively low liquid levels (<30%), growing to a linear increase at intermediate levels (30-60%), with a slow increase to 100% over the last part of the curve (>60%). The exponential increase of the AFA in the curve is advantageous, as this allows for rapid compensation of the liquid level by draining the liquid increasingly faster at elevated liquid levels, making it easier to control the liquid levels between predetermined boundaries.

Flow area profile C is somewhat similar to profile B, showing an exponential increase of the AFA at the beginning of the curve, while above 50% the curve becomes essentially linear up to 100%.

Flow area D shows a relatively slow linear increase of the AFA, followed by a sharp knee increase above 80%. For the part of the flow area profile before the knee around 80% the increase in flow area is lower than the increase in liquid level, whereas for the part of the flow area profile after the knee around 80%, the increase in flow area is higher than the increase in liquid level.

The invention claimed is:

1. A sub sea multi-phase distribution system for a gas/liquid mixture comprising hydrocarbons and an antihydrate-forming agent, the subsea multi-phase distribution system, comprising:
    at least one distribution chamber provided with a distribution surface for spreading liquid,
    at least one inlet, arranged for supplying a hydrocarbon-containing gas/liquid mixture to the distribution surface,
    a collecting space at least partly defined by the distribution surface, for collecting gas separated from the gas/liquid mixture,
    multiple outlet elements arranged on the distribution surface, and
    multiple heat exchange channels, wherein
    each heat exchange channel is connected to or forms a respective outlet elements,
    each outlet element transports gas from the collecting space and liquid from the distribution surface away from the distribution chamber to a respective heat exchange channel, and
    each outlet element comprises at least one flow aperture, and the flow aperture is arranged to provide a gas flow area for transporting gas from the collecting space and a liquid flow area for transporting liquid from the distribution surface, such that both gas and liquid are transported through each flow aperture to each respective heat exchange channel.

2. The sub sea multi-phase distribution system according to claim 1, wherein the outlet elements protrude from the distribution surface towards the collecting space.

3. The sub sea multi-phase distribution system according to claim 1, wherein the outlet elements are designed to transport away both gas and liquid simultaneously.

4. The sub sea multi-phase distribution system according to claim 1, wherein the at least one flow aperture is arranged to provide a flow area profile, wherein the liquid flow area increases as a function of the increasing liquid level on the distribution surface.

5. The sub sea multi-phase distribution system according to claim 4, wherein for at least part of the flow area profile, the liquid flow area increases as a non-linear function of the increasing liquid level on the distribution surface.

6. The sub sea multi-phase distribution system according to claim 5, wherein for at least part of the flow area profile, the liquid flow area increases at a higher rate than the increase in liquid level on the distribution surface.

7. The sub sea multi-phase distribution system according to claim 4, wherein at least part of the flow aperture is V-shaped.

8. The sub sea multi-phase distribution system according to claim 4, wherein the at least one flow aperture comprises at least one circular or ellipsoid hole.

9. The sub sea multi-phase distribution system according to claim 4, wherein the at least one flow aperture comprises at least one slit.

10. The sub sea multi-phase distribution system according to claim 4, wherein the outlet element comprises multiple flow apertures arranged in a pattern.

11. The sub sea multi-phase distribution system according to claim 1, wherein the distribution chamber is provided with at least one baffle element to reduce flow momentum and arranged to prevent direct spilling of the gas/liquid mixture from the inlet to the outlets.

12. A sub sea heat exchanger comprising the sub sea multi-phase distribution system according to claim 1, wherein the outlet elements of the multi-phase distribution system are connected to heat exchange elements.

13. A method of using the sub sea multi-phase distribution system according to claim 1, comprising:

placing sub sea multi-phase distribution system in sea, and distributing a multiphase mixture comprising hydrocarbons using the sub sea multi-phase distribution system.

* * * * *